MEANS FOR MOUNTING AND ELECTRICALLY INTERCONNECTING CIRCUIT INTERRUPTING DEVICES

Filed April 9, 1965

Inventors
Herbert M. Pflanz
Zygmunt A. Wachta
By Thomas F. Kirby
Attorney 3,352,988
Patented Nov. 14, 1967

3,352,988

MEANS FOR MOUNTING AND ELECTRICALLY INTERCONNECTING CIRCUIT INTERRUPTING DEVICES

Zygmunt A. Wachta, Boston, Mass., and Herbert Maximilian Pflanz, Nuenen, Netherlands, assignors to Allis-Chalmers Manufacturing Company, Milwaukee, Wis.

Filed Apr. 9, 1965, Ser. No. 446,833
1 Claim. (Cl. 200—144)

ABSTRACT OF THE DISCLOSURE

A tubular electrical insulator having annular indentations therein has switch modules located at either end and on opposite sides of the insulator. The switch modules are electrically connected in series by a conductive member which has a portion disposed in an indentation in the insulator and which is clamped to the insulator by a two piece removable clamp.

Figure 1:
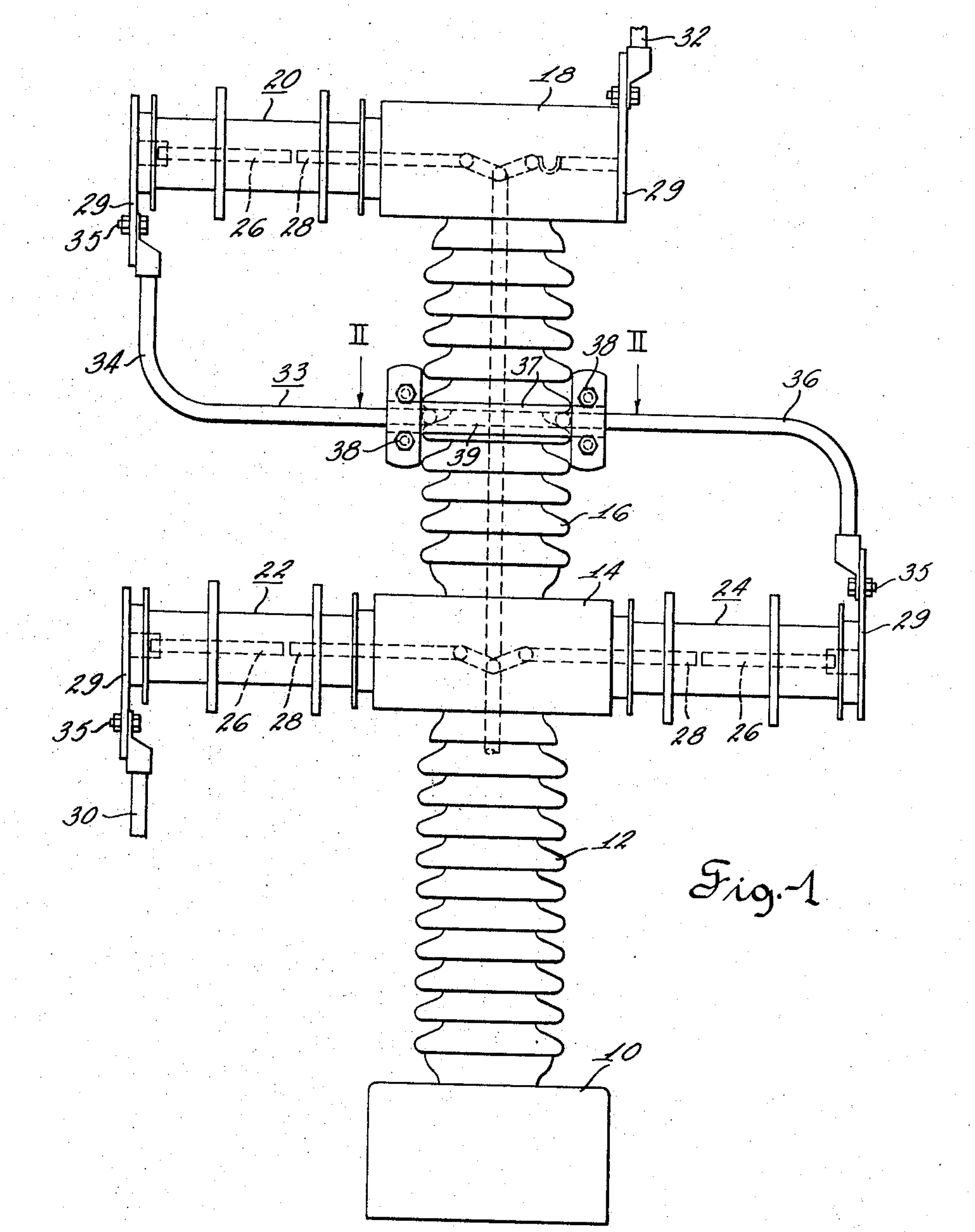

This invention relates to means for mounting and electrically interconnecting circuit interrupting devices such as high voltage type switches.

Polyphase high voltage electrical power transmission systems sometimes employ a plurality of series connected simultaneously operable switches, such as vacuum switches or interrupters, in each phase line of the system. Such switches are located in a region of high potential and are mounted in spaced apart relationship on insulating supports attached to a suitable metal framework. Space considerations, problems of electrical clearance and ease of serviceability and replacement dictate the arrangement and means of mounting and electrical interconnection of the switches in particular installations.

In accordance with the present invention there is provided a tubular insulator which has a switch located at one end and another switch located at its other end. Each switch is provided with a terminal. The switches are connected in series with each other by an improved external connector which is mechanically secured to the tubular insulator.

In a preferred embodiment of the present invention two tubular insulators are rigidly joined together end-to-end by a first metal housing. One end of one of the tubes is mounted on supporting framework, and a second metal housing closes the other end of the other of the tubes. A pair of switches are mounted on two opposite sides of the first metal housing and are electrically connected in series therethrough. A third switch is mounted on one side of the second metal housing and is electrically connected in series with one of the pair of switches opposite therefrom by an external connector which is mechanically secured to the tubular insulator located between the two housings. Means are provided within the tubes and the metal housings for operating the three switches simultaneously.

It is an object of the present invention to provide improved means for mounting and electrically interconnecting circuit interrupting devices such as vacuum switches.

Another object is to provide improved means for electrically interconnecting switches which are mounted in spaced apart relationship on insulating supports.

Another object is to provide improved means of the aforesaid character for use with high voltage type switches.

Another object is to provide means of the aforesaid character which are mechanically strong and have electrical characteristics which resist flashover and short-circuiting.

Another object is to provide improved means for electrically connecting high voltage type switches which are mounted in spaced apart relationship on insulating support columns, such means aiding in mechanically supporting the switches on the column and rigidifying the entire switch and column assembly.

Another object is to provide improved means of the aforesaid character which are economical to fabricate and install and which are readily detachable to permit servicing and replacement of the switches.

Other objects and advantages of the invention will hereinafter appear.

The accompanying drawing illustrates a preferred embodiment of the invention but it is to be understood that the embodiment illustrated is susceptible of modifications with respect to details thereof without departing from the scope of the appended claim.

Figure 2:
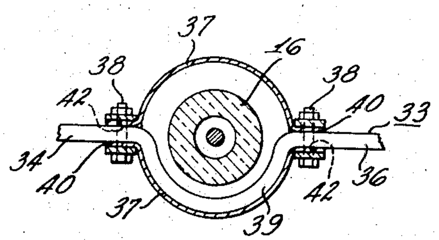

In the drawing:

FIG. 1 is a side elevational view of electrical circuit interrupting apparatus employing connecting means in accordance with the present invention; and FIG. 2 is a sectional view taken along lines II—II of FIG. 1 showing the connecting means.

Referring to FIG. 1, the numeral 10 designates a portion of a metal framework for supporting circuit interrupting apparatus used in a high voltage electrical power transmission system. A tubular insulator member 12 having a plurality of annular indentations on the exterior surface thereof is rigidly mounted on framework 10, a housing 14 is rigidly mounted on insulator 12, another tubular insulator member 16 is rigidly mounted on housing 14, and another housing 18 is rigidly mounted on insulator 16. A switch 20 is rigidly mounted on one side of housing 18. A switch 22 is rigidly mounted on one side of housing 14 and a switch 24 is rigidly mounted on another side of housing 14. In the embodiment shown switches 22 and 24 are on opposite sides of housing 14 and switch 20 is on the same side of the apparatus as switch 22.

Each switch 20, 22 and 24 comprises a pair of relatively movable contacts 26 and 28 which are understood to be movable into and out of engagement to circuilt closed and circuit open positions. As will be understood, the contacts of the switches 20, 22 and 24 are simultaneously operable by switch operating means which is understood to be located within the insulators 12 and 16 and the housings 14 and 18.

Each switch 20, 22 and 24 is provided with a terminal 29 located externally thereof to facilitate electrical connections to one of the contacts thereof. The terminals are spaced outwardly from the insulators. In an actual embodiment, the switches employed were vacuum switches having contacts mounted within an evacuated glass housing.

One side 30 of a phase line which is part of the electrical power transmission system is electrically connected to contact 26 of switch 22. Contact 28 of switch 22 is electrically connected through housing 14 to contact 26 of switch 24. Contact 28 of switch 20 is electrically connected to the other side 32 of the phase line.

Referring to FIGS. 1 and 2, conductive means are provided to electrically connect contact 26 of switch 20 to contact 26 of switch 24. Such means comprise a conductive member 33 having portions 34 and 36, and a semicircular portion 39. Conductor 33 has its ends electrically and mechanically connected to the terminals 29 of the switches 20 and 24, respectively, as by bolting at 35. Semicircular portion 39 between the portions 34 and 36 of conductive member 33 is connected by a pair of electrically conductive clamping members 37 to insulator 16.

Means such as bolts 38 are provided to connect the two clamping members 37 together and to mechanically connect them to insulator 16. In the embodiment shown, the clamping members 37 are each semicircular in form with end flanges 40 perforated as at 42 to receive the bolts 38, and conform to the shape of the exterior of insulator 16. Semicircular portion 39 of conductor 33 is disposed within one of the annular indentations in insulator 16.

The conductive means hereinbefore described afford a sound electrical connection between the switches 20 and 24. As is apparent from FIG. 1, the conductive means are relative long and by being secured to insulator 16 inadvertent movement thereof caused by wind, falling ice and so forth is prevented. In addition, attachment of the conductive means to insulator 16 tends to rigidify an otherwise relatively spindly structure. Since the clamping members 37 engage an annular indentation in insulator 16, they are prevented from moving along the insulator.

It will be apparent that the appended claim contemplates other switch arrangements and conductor arrangements than that shown. For example, although the insulators 12 and 16 are as vertically disposed and the switches 20, 22 and 24 extend transversely with respect thereto, the insulators could extend horizontally from framework 10.

The embodiments of the invention in which an exclusive property or privilege is claimed and defined are as follows:

In electric circuit interrupting apparatus, in combination, a support, a first tubular insulator mounted on said support, a first housing mounted on said first insulator, a second tubular insulator mounted on said first housing, said second insulator having annular indentations on the exterior surface thereof, a second housing mounted on said second insulator, a pair of switches mounted on opposite sides of said first housing, a third switch mounted on a side of said second housing in alignment with one of said pair of switches, said switches being operable by operating mechanism located within said insulators and said housings, each switch having a terminal which is spaced outwardly from said insulators, a unitary conductive member located externally of said switches and said insulators for electrically connecting the terminal on said third switch with the terminal on one of said pair of switches, said conductive member having a portion disposed within one of said indentations on said second insulator, and means comprising a pair of electrically conductive clamping members for mechanically connecting said conductive member to said second insulator, one of said pair of clamping members enclosing said portion of said conductive member.

References Cited

UNITED STATES PATENTS

| | | | |
|---|---|---|---|
| 751,459 | 2/1904 | Chesney | 174—148 |
| 2,149,760 | 3/1939 | Carlson | 174—172 |
| 2,218,769 | 10/1940 | Postlethwait | 174—169 |

FOREIGN PATENTS

| | | |
|---|---|---|
| 1,141,712 | 3/1957 | France. |
| 1,247,451 | 10/1960 | France. |

ROBERT S. MACON, *Primary Examiner.*